Dec. 15, 1931.  F. S. STICKNEY  1,836,995
VISCOSIMETER
Filed June 7, 1926

WITNESSES:
E. A. McCloskey
B. R. King

INVENTOR
Fernald S. Stickney.
BY
Wesley G. Carr
ATTORNEY

Patented Dec. 15, 1931

1,836,995

UNITED STATES PATENT OFFICE

FERNALD S. STICKNEY, OF PITTSBURGH, PENNSYLVANIA, ASSIGNOR TO WESTINGHOUSE ELECTRIC & MANUFACTURING COMPANY, A CORPORATION OF PENNSYLVANIA

VISCOSIMETER

Application filed June 7, 1926. Serial No. 114,270.

My invention relates to viscosimeters and it has for its object to provide a meter device that shall provide a continuous indication of the viscosity of a fluid while the fluid is in the process of manufacture.

In manufacturing certain varnishes, oils and syrups, it is sometimes necessary to heat the ingredients in a kettle for some time. During this process, chemical combinations or physical changes take place. The viscosity of the liquid may change very rapidly at certain stages in the process. The hot liquid must be drawn from the kettle when it reaches a certain definite viscosity. If it is not drawn at the proper time, it may in some cases thicken very rapidly and become unfit for use.

At the present time, the only viscosimeters available are of the laboratory type. In measuring viscosity with the laboratory-type viscosimeter, it is necessary to remove a sample of the liquid from the tank, transport it to the laboratory, and there determine its viscosity. This laboratory process takes an appreciable length of time. In the meantime, if the heating operation be carried too far, the liquid becomes too thick.

I overcome the above disadvantages by mounting a device constructed in accordance with my invention directly on the tank that is used for cooking the varnish or syrup in order that an indication of the viscosity of the liquid may be obtained at any instant and without delay.

Figure 1:
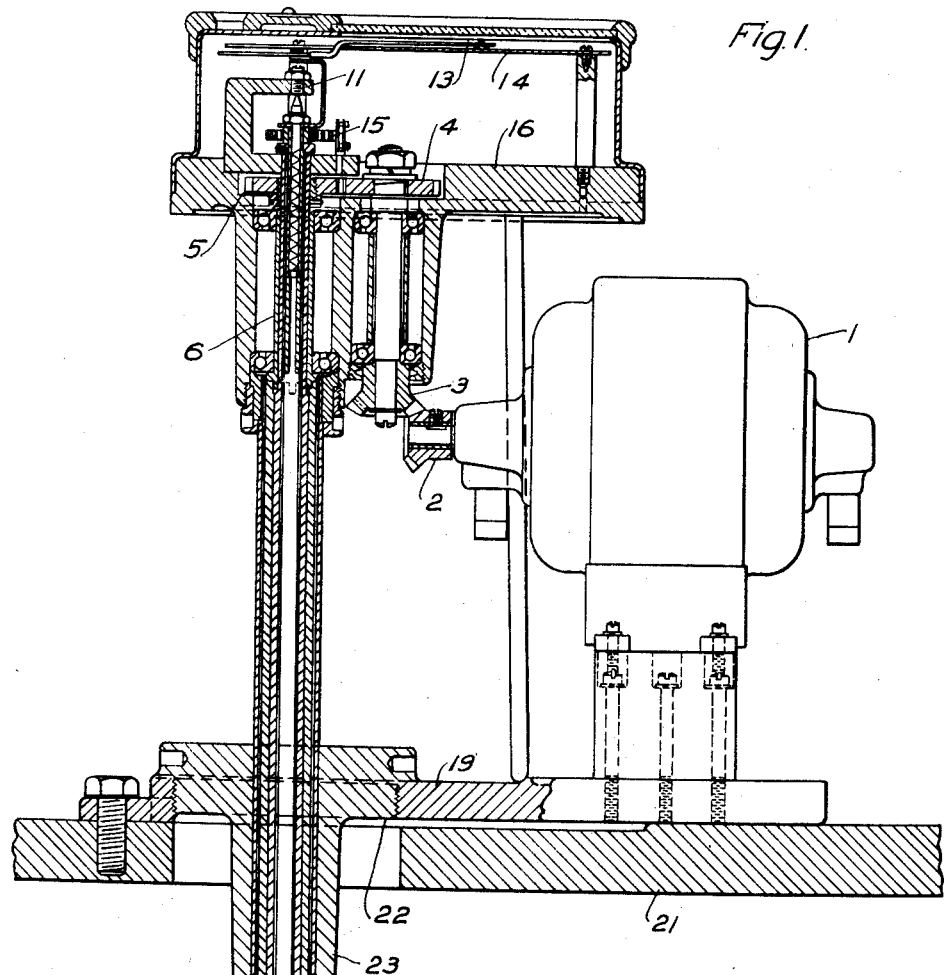
Figure 2:
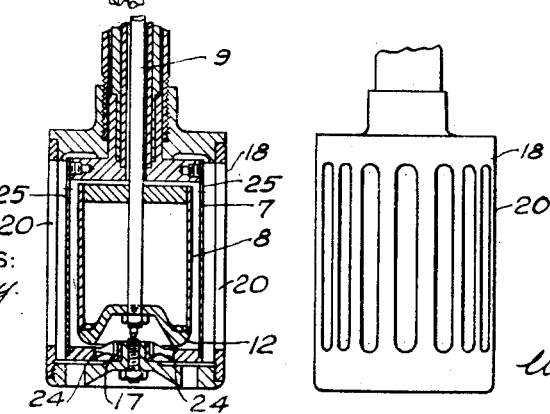

Figure 1 of the accompanying drawings is a vertical sectional view through a viscosimeter embodying my invention, and Fig. 2 is a detail view of a part of the device shown in Fig. 1.

An asynchronous motor 1 rotates at constant speed and by means of gears 2, 3, 4 and 5 and the shaft 6 drives a rotational drum 7. A viscosimeter drum 8 is mounted inside the rotational drum 7 on the shaft 9 which turns between the jeweled bearings 11 and 12. The pointer 13 is secured to the shaft 9. Under the pointer 13 the scale 14, suitably calibrated, is mounted. A spiral spring 15 is connected between the shaft 9 and a frame 16. Any torque applied to the viscosimeter drum 8 will tend to turn the shaft 9 and produce a deflection of the spring proportional to the applied torque. This deflection is indicated by the pointer 13 in cooperation with the scale 14.

When a viscous liquid is introduced between the rotating drum 7 and the viscosimeter drum 8 by a pump 17, that comprises propeller blades cut in the lower portion of the drum 7, torque is transmitted through the liquid and causes a deflection of the shaft 9 and the pointer 13. The deflection of the pointer 13 is proportional to the viscosity of the liquid. A shell 18 is provided around the drum 7 to screen the rotating parts of the viscosimeter from injury when the drum assembly is immersed in the liquid. The complete apparatus is mounted on a base 19 that may be removably secured to the tank cover 21. A removable handhole cover 23 threaded at 22 to the base 19 serves as a guide to add rigidity to the drum assembly and permits removal of the drums for cleaning and inspection without disturbing the mounting of the base 19.

The rotatable drum 7 is partially closed at the top and the bottom. A number of openings 24 are provided at the bottom near the center. Other openings 25 are provided near the top at the periphery. When the drum 7 is rotated, liquid is expelled from openings 25, and fresh liquid enters at 24 to take its place. This produces a continuous longitudinal flow of liquid between the rotatable drum 7 and the viscosimeter drum 8. The instrument measures the viscosity of this constantly changing film of liquid. Such action is desirable by virtue of the fact that the average viscosity of the liquid in the tank is to be measured. If the pump in the drum 7 were omitted, only the viscosity of the liquid surrounding the device locally would be measured.

The advantage of the above indicating viscosimeter over the laboratory type can be readily seen when it is understood that the indicating type is mounted directly on the tank which is used for processing the liquid, and gives a continuous indication of the viscosity of the fluid.

I claim as my invention:

1. A meter device for continuously indicating the viscosity of a liquid while the said liquid is in the process of manufacture, comprising a rotatable drum mounted for immersion in the liquid to be tested, means for actuating the rotatable drum, and means including a dynamometer drum immersed in said liquid and co-acting with said rotatable drum for indicating the viscosity of said liquid.

2. A meter device for indicating the viscosity of a liquid, comprising a rotatable drum mounted for immersion in the liquid to be tested, a constant speed device for actuating said drum, and means including a viscosimeter drum deflectable by a torque transmitted by the liquid and an indicator associated therewith for showing the viscosity of said liquid.

3. A meter for indicating the viscosity of a liquid, comprising a rotatable drum mounted for immersion in a liquid to be tested, a motor for actuating the rotatable drum, a viscosimeter drum also mounted for immersion in said liquid whereby a torque is transmitted by the liquid to the viscosimeter drum upon rotation of the rotatable drum, a spring balancing the torque of the viscosimeter drum, and an indicator associated with the viscosimeter drum.

4. A meter device for indicating the viscosity of a liquid comprising rotary pumping device including a rotary drum, means including a motor for actuating the rotatable drum and the rotary pumping device, a viscosimeter drum disposed adjacent to the rotatable drum, the liquid constituting a means for transmitting torque from the rotatable drum to the viscosimeter drum, a spiral spring associated with the viscosimeter drum to absorb the torque and an indicating means connected to the viscosimeter drum.

5. An indicating meter for determining the viscosity of a liquid while in the process of manufacture, comprising a rotatable drum, a rotary pumping device combined in the rotatable drum for forcing a liquid of representative viscosity of the total liquid into the rotatable drum, means including a synchronous motor for actuating the rotatable drum, a viscosimeter drum turned in accordance with the torque that is transmitted through the liquid from said rotatable drum, a spiral spring associated with the viscosimeter drum to absorb said torque and indicating means associated with said viscosimeter drum.

6. A meter device for indicating the viscosity of a liquid, comprising a rotatable drum mounted for immersion in the liquid to be tested, a viscosimeter drum mounted adjacent said rotatable drum for indicating the viscosity of said liquid, and means for supplying liquid to the space between said drums including a rotary pumping device.

7. A meter device for indicating the viscosity of a liquid, comprising a rotatable drum mounted for immersion in the liquid to be tested, a viscosimeter drum mounted adjacent said rotatable drum for indicating the viscosity of said liquid, and means for supplying liquid to the space between said drums including a rotary pumping device, said pumping device comprising a propeller integral with said rotatable drum.

8. A viscosimeter comprising a rotatable member mounted for immersion in a fluid to be tested, means for rotating said member, and means including a second member actuated by said rotatable member through the medium of said fluid for indicating the viscosity of said fluid.

9. In combination, in a viscosimeter, telescopically related elements for immersion in a liquid, means for turning one of said elements, another of said elements being responsive to movement of said one element by drag effect of said liquid, means for balancing the torque of said responsive element, indicating means actuated by said responsive element, and elongated telescopically-related elements connecting said one and said responsive elements to said turning means and to said indicating means, respectively.

10. In combination, in a viscosimeter unit, a support for mounting above a liquid, a motor and a meter carried by the support, a movable element for immersion in the liquid, an element responsive to movement of said first element by drag effect of said liquid, and an elongated structure extending from the motor and the meter to said elements to actuate said movable element by the motor and to actuate the meter from said responsive element.

11. In combination, in a viscosimeter, a main support for mounting above a liquid, a motor and a meter mounted on said support, an auxiliary support depending from said main support, a drum element pivotally supported adjacent to the lower end of said auxiliary support for immersion in the liquid, an elongated shaft connected between the drum and the meter and pivotally mounted adjacent to its upper end in the meter, indicating means and means for balancing the movement of said drum disposed in the meter and connected to said shaft, a second drum surrounding said first drum for actuating the same by drag effect of the liquid, and means including a tube surrounding said shaft connecting the second drum to said motor.

In testimony whereof, I have hereunto subscribed my name this 2nd day of June, 1926.

FERNALD S. STICKNEY.